(12) United States Patent
Takegawa et al.

(10) Patent No.: US 6,476,101 B2
(45) Date of Patent: Nov. 5, 2002

(54) METHOD FOR PRODUCING PIGMENT DISPERSING RESIN FOR CATIONIC ELECTRODEPOSITION PAINT

(75) Inventors: Masahiro Takegawa, Nara-ken (JP); Makoto Ando, Osaka-fu (JP); Keisuke Tsutsui, Hyogo-ken (JP); Shinsuke Shirakawa, Osaka-fu (JP); Mitsuo Yamada, Osaka-fu (JP)

(73) Assignee: Nippon Paint Co., Ltd., Osaka-fu (JP)

( * ) Notice: Subject to any disclaimer, the term of this patent is extended or adjusted under 35 U.S.C. 154(b) by 25 days.

(21) Appl. No.: 09/725,754

(22) Filed: Nov. 30, 2000

(65) Prior Publication Data

US 2001/0039307 A1 Nov. 8, 2001

(30) Foreign Application Priority Data

Nov. 30, 1999 (JP) ............................................. 11-339103

(51) Int. Cl.$^7$ .............................. C08K 3/20; C08L 63/02
(52) U.S. Cl. ........................ 523/404; 523/414; 523/456; 528/108; 528/109; 528/119; 528/418
(58) Field of Search ................................. 523/456, 404, 523/414; 528/108, 109, 119, 418

(56) References Cited

FOREIGN PATENT DOCUMENTS

GB          2349643          * 11/2000

\* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

To provide a method for producing a pigment dispersing resin varnish for cationic electrodeposition paint, wherein the flow properties and appearance of the resulting electrodeposition coating film are not compromised when using as a solvent a compound that is not volatilized into the atmosphere but remains in the electrodeposition coating film during the onium conversion of a pigment dispersing resin, as well as a cationic electrodeposition resin composition allowing HAPs to be eliminated and volatile organic carbon compounds to be reduced (VOC reduction). A method for producing a pigment dispersing resin varnish for use with cationic electrodeposition paint, wherein a solvent comprising a polyalkylene oxide compound represented by the following formula is used to produce a resin varnish which has been obtained from a cationic epoxy resin composition having amino groups, phosphonium groups, or sulfonium groups.

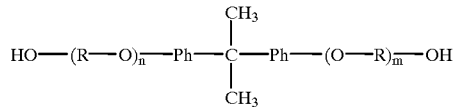

(where R is an ethylene group or propylene group; Ph is a phenylene group; and both n and m are a number of 1 or more).

16 Claims, No Drawings

METHOD FOR PRODUCING PIGMENT DISPERSING RESIN FOR CATIONIC ELECTRODEPOSITION PAINT

BACKGROUND OF THE INVENTION

1. Field of the Invention

The present invention relates to a method for producing a pigment dispersing resin varnish for cationic electrodeposition paint, a pigment dispersing resin varnish obtained therefrom, and a cationic electrodeposition coating composition using the pigment dispersing resin varnish.

2. Description of the Related Art

Recent increased awareness of the environment has led to controls on the amounts of harmful air pollutants (HAPs) in the more advanced nations. Cationic electrodeposition paint are aqueous paint based on water media, but a potential HAP component (for example, cellosolves, such as butyl cellosolve or ethyl cellosolve) is the solvent that is used during the production of the cationic epoxy resin upon the reaction of an amine, phosphine, or sulfide with the epoxy resin starting material, that is, during the onium conversion of the pigment dispersing resin, at the stage where the pigment dispersing resin is produced. Since the cellosolve solvents are readily volatilized, when such substances are contained in cationic electrodeposition paint, they run the risk of evaporating into the atmosphere and becoming a source of harmful air pollutants. The use of alternatives results in the risk of electrodeposition coating films with lower flow properties and a less attractive appearance.

SUMMARY OF THE INVENTION

An object of the present invention is to provide a method for producing a pigment dispersing resin varnish for cationic electrodeposition paint, wherein the flow properties and appearance of the resulting electrodeposition coating film are not compromised, despite the fact that no cellosolve solvent is used, as well as a cationic electrodeposition resin composition allowing volatile organic carbon compounds to be reduced (VOC reduction).

The method for producing a pigment dispersing resin varnish for cationic electrodeposition paint in the present invention comprises the step of using a solvent comprising a polyalkylene oxide compound represented by the following formula for producing a resin varnish which is obtained from a cationic epoxy resin composition having amino groups, phosphonium groups, or sulfonium groups.

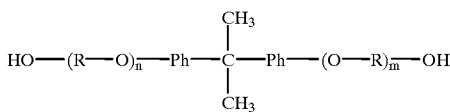

(where R is an ethylene group or propylene group; Ph is a phenylene group; and both n and m are a number of 1 or more).

The aforementioned solvent is preferably added to the cationic epoxy resin composition which has been obtained upon the reaction of an amine, phosphine, or sulfide with an epoxy resin.

Another way of using the solvent is to employ it as a reaction solvent during the production of the cationic epoxy resin composition upon the reaction of an amine, phosphine, or sulfide with an epoxy resin.

The epoxy resin is preferably a urethane-modified epoxy resin.

R in the formula for the polyalkylene oxide compound is preferably an ethylene group, and the total of n and m is preferably 2 or more but less than 20.

The content of the polyalkylene oxide in the solvent is preferably 5 to 100 wt %.

The pigment dispersing resin varnish of the present invention is obtained by the aforementioned method for the production of pigment dispersing resin varnishes for cationic electrodeposition paint, where the content of the polyalkylene oxide compound in the resin varnish is preferably 1 to 50 wt %. The cationic electrodeposition coating composition of the present invention comprises a pigment dispersing resin varnish obtained in this manner, and has a polyalkylene oxide compound content of 0.1 to 2.0 wt %.

DETAILED DESCRIPTION OF THE INVENTION

The method for producing a pigment dispersing resin varnish for cationic electrodeposition paint in the present invention comprises the step of using a solvent comprising a polyalkylene oxide compound represented by the following formula for producing a resin varnish comprising a cationic epoxy resin composition having amino groups, phosphonium groups, or sulfonium groups:

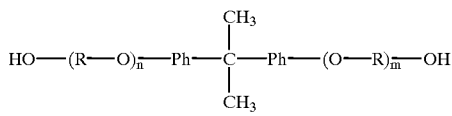

(where R is an ethylene group or propylene group; Ph is a phenylene group; and both n and m are a number of 1 or more). That is, in the method for producing the pigment dispersing resin varnish, when the amine, phosphine, or sulfide reacts with the epoxy resin described below to bring about onium conversion, that is, when amino, phosphonium, or sulfonium groups are introduced, the epoxy resin is first dissolved in a solvent comprising the aforementioned polyalkylene oxide compound, or the aforementioned solvent is added to the cationic epoxy resin composition obtained following the aforementioned onium conversion reaction, so as to produce the pigment dispersing resin varnish. The amine, phosphine, or sulfide that is added reacts with the epoxy groups present in the epoxy resin, to introduce the onium groups into the epoxy resin.

Examples of the aforementioned epoxy resin generally include polyepoxides. The epoxides have an average of two or more 1,2-epoxy groups per molecule. The polyepoxides should have 180 to 1,000 epoxy equivalents, and preferably 375 to 800 epoxy equivalents. Fewer than 180 epoxy equivalents will not allow a film to be formed during electrodeposition, and thus will not allow a coating film to be obtained. More than 1,000 will result in an insufficient amount of onium groups per molecule, and thus in insufficient water solubility.

Useful examples of the polyepoxides include polyglycidyl ethers of polyphenols (such as bisphenol A). These can be prepared by etherifying a polyphenol with epichlorohydrin or dichlorohydrin in the presence of an alkali. The polyphenols can be bis(4-hydroxyphenyl)-2,2-propane, 4,4'-dihydroxybenzophenone, bis(4-hydroxyphenyl)-1,1-ethane, or similar materials.

The aforementioned epoxy resins may be epoxy resins containing oxazolidone rings in the resin skeleton, in the epoxy resin in the main emulsion described below.

Epoxy resins containing hydroxyl groups in particular may be urethane-modified epoxy resins with blocked isocyanate groups introduced by reaction of half-blocked isocyanates with the hydroxyl groups.

The half-blocked isocyanates used for reactions with the aforementioned epoxy resins may be prepared by partial blocking of organic polyisocyanates. The reaction between the organic polyisocyanates and blocking agents is preferably carried out while the material is cooled to between 40 and 50° C. as the blocking agent is added in the form of drops while stirred in the presence of a tin catalyst as needed.

The aforementioned organic polyisocyanates can be any having two or more isocyanate groups per molecule. Specific examples include aliphatic compounds such as trimethylene diisocyanate or hexamethylene diisocyanate; alicyclic compounds such as 1,3-cyclopentane diisocyanate, 1,4-cyclohexane diisocyanate, or isophorone diisocyanate; aromatic compounds such as 2,4-tolylene diisocyanate, diphenylmethane-4,4'-diisocyanate, or 1,4-naphthalene diisocyanate; and polyisocyanates such as dimers or trimers thereof.

Lower aliphatic alkyl monoalcohols with 4 to 20 carbon atoms are suitable blocking agents for preparing the aforementioned half-blocked isocyanates. Specific examples include butyl alcohol, amyl alcohol, hexyl alcohol, 2-ethylhexyl alcohol, heptyl alcohol, and eicosanol.

The reaction between the aforementioned epoxy resin and half-blocked isocyanates is carried out by being held for about 1 hour preferably at 140° C.

R in the formula for the aforementioned polyalkylene oxide compounds is preferably an ethylene group, and the total of n and m is preferably 2 or more but less than 20, and even more preferably 2 to 10. A total of less than 2 results in greater susceptibility for volatilization into the atmosphere, while more than 20 runs the risk of resulting in an electrodeposition coating film that is unattractive.

The aforementioned solvents preferably contain 5 to 100 wt % polyalkylene oxide compound. That is, at a content of 5 wt % or more, the solvent may itself be the aforementioned polyalkylene oxide compound. A polyalkylene oxide compound content of less than 5 wt % complicates the effort to achieve VOC reduction. Examples of solvents other than the aforementioned polyalkylene oxide compounds which the aforementioned solvent may contain can include solvents commonly used in the synthesis of resins for electrodeposition paint, for example, ethers such as ethylene glycol monomethyl ether, ethylene glycol monoethyl ether, ethylene glycol monopropyl ether, ethylene glycol monobutyl ether, 3-methyl-3-methoxybutanol, diethylene glycol monobutyl ether, and dipropylene glycol monobutyl ether; and alcohols such as butanol.

The content of the polyalkylene oxide compound in the aforementioned solvents is 5 to 100 wt %, as noted above, but the preferred range of the aforementioned polyalkylene oxide compound content is based on differences in the types of onium groups introduced to the epoxy reins, that is, primary amino groups, quaternary ammonium groups, sulfonium groups, or phosphonium groups. For example, the range is 5 to 50 wt % for primary amino groups, 5 to 100 wt % for quaternary ammonium groups, and 5 to 100 wt % for sulfonium groups.

The onium conversion reaction of the epoxy resins is carried out by dissolving the epoxy resin in the aforementioned solvent to allow the amine, phosphine, or sulfide to react with the epoxy groups. The details are described in further detail below Primary amino groups or quaternary ammonium groups can be introduced to allow amines to react with an epoxy resin.

In the case of the former, when the reaction is brought about by directly adding the primary amine to the epoxy resin solution, the primary amino groups themselves end up reacting with the epoxy groups, so a polyamine with primary amino groups and secondary amino groups is used to allow a compound obtained by the ketimination of the primary amino groups to react with the epoxy groups in an epoxy resin dissolved in the aforementioned solvent. After the reaction, the ketimine blocks are removed, the primary amino groups are reproduced, and an ammonium salt of a primary amine is produced by neutralization.

Examples of polyamine compounds at such times include diethylenetriamine, aminoethyl ethanolamine, and aminoethyl piperazine. These polyamines are ketiminated by reaction with a ketone such as acetone, methyl ethyl ketone, or methyl isobutyl ketone. The ketimination reaction will readily progress when heated to 100° C. or higher to distill off the water that is produced.

The reaction between the partial ketimine compound and epoxy resin is held for 1 hour at 120° C. and then cooled to 90° C., a suitable amount of pure water is introduced, and the ketiminated primary amino groups are reproduced. The amount of the polyamine and epoxy resin used here is preferably an equivalent ratio of 1/2 to 1.2/1.

When quaternary ammonium groups are introduced, on the other hand, a neutral acid salt of a tertiary amine is allowed to react with the epoxy groups of the epoxy resin. The tertiary amine should have 3 to 6 carbon atoms, and may have hydroxyl groups. Specific examples of tertiary amines include dimethylethanolamine, trimethylamine, triethylamine, dimethylbenzylamine, diethylbenzylamine, N,N-dimethylcyclohexylamine, tri-n-butylamine, diphenethylmethylamine, dimethylaniline, and methylmorpholine.

The reaction between the epoxy resin and the neutral acid salt of a tertiary amine can be carried out in the usual manner. For example, a solution comprising the epoxy resin dissolved in the aforementioned solvent is heated to between 60 and 100° C., a tertiary amine is added thereto, and the reaction is carried out for 2 to 10 hours. Examples of neutral acids include organic acids or inorganic acids such as hydrochloric acid, nitric acid, phosphoric acid, formic acid, acetic acid, and lactic acid.

When the onium conversion is managed through the reaction of a sulfide, sulfonium groups are introduced by bringing about a reaction between a sulfide and the epoxy groups in the epoxy resin. Specifically, the reaction is carried out at a temperature of 70 to 750° C. by mixing and stirring water, a sulfide neutral acid, and epoxy resin dissolved in the aforementioned solvent. Examples of sulfides include aliphatic sulfides, mixtures of aliphatic and aromatic sulfides, aralkyl sulfides, and cyclic sulfides. Specific examples include 1-(2-hydroxyethylthio)-2-propanol, diethyl sulfide, dipropyl sulfide, dibutyl sulfide, diphenyl sulfide, dihexyl sulfide, ethylphenyl sulfide, tetramethylene sulfide, pentamethylene sulfide, thiodiethanol, thiodipropanol, and thiodibutanol. The amount of sulfide and epoxy resin is preferably an equivalent ratio of 1/1 to 5/1.

Finally, when onium conversion is managed through the reaction of a phosphine, the phospine reacts with the epoxy groups in the epoxy resin. Specifically, a phosphine, and preferably an organic phosphine, is allowed to react with an epoxy resin dissolved in the aforementioned solvent. The reaction conditions are the same as those for sulfides.

The pigment dispersing resin varnish for cationic electrodeposition paint in the present invention is obtained by the method described above. The resin varnish contains 1 to 50 wt % polyalkylene oxide compound. Less than 1 wt % makes VOC reduction more difficult, whereas more than 50 wt % runs the risk of resulting in lower corrosion resistance. A pigment and the resulting pigment dispersing resin varnish are dispersed in an aqueous medium, giving a pigment dispersion paste.

The aforementioned pigment can be any commonly used pigment. Examples include coloring pigments such as titanium white, carbon black, and red oxide; body pigments such as kaolin, talc, aluminum silicate, calcium carbonate, mica, clay, and silica; and rust-proof pigments such as zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, and aluminum phosphomolybdate.

The pigment dispersing resin varnish and the pigment, in an amount of 10 to 1000 weight parts per 100 weight parts resin solids, are mixed and dispersed using a common dispersing device such as a ball mill or sand grind mill until the particle diameter of the pigment in the mixture is the desired mean particle diameter, giving a pigment dispersion paste.

The resulting pigment dispersion paste and a separately prepared amine-modified epoxy resin, blocked polyisocyanate curing agent, and neutralizing agent can be dispersed in an aqueous medium to obtain a cationic electrodeposition paint.

The amino-modified epoxy resin is described in detail below.

Amino-modified epoxy resins are well-known resins used in common cationic electrodeposition paint, the details of which have been disclosed in Japanese Patent Publication (Kokoku) Nos.S55-34238, S56-34186, and S59-15929. Generally used amine-modified epoxy resin have a molecular weight of 600 to 8,000, an amine value of 16 to 230, and epoxy equivalents ranging from 300 to 4,000.

Typically, all of the epoxy rings of bisphenol type epoxy resin undergo ring-opening with an active hydrogen compound allowing the introduction of cationic groups, or some of the epoxy rings undergo ring-opening with other active hydrogens, and the remaining epoxy rings undergo ring-opening with active hydrogen compounds allowing the introduction of cationic groups.

Typical examples of bisphenol types of epoxy resins include bisphenol A or bisphenol F types of epoxy resins. Examples of commercially available products of the former include Epikote 828 (by Petrochemical Shell Epoxy, 180 to 190 epoxy equivalents), Epikote 1001 (same, 450 to 500 equivalents), and Epikote 1010 (3000 to 4000 epoxy equivalents). Examples of commercially available products of the latter include Epikote 807 (same, 170 epoxy equivalents).

Primary amines and secondary amines are active hydrogen-containing compounds allowing the introduction of cationic groups. Examples include butylamine, octylamine, diethylamine, dibutylamine, methylbutylamine, monoethanolamine, diethanolamine, N-methylethanolamine, as well as secondary amines comprising blocked primary amines such as ketimines of aminoethylethanolamine, and diketimines of diethylenetriamine. Such amines may be used in combination.

Examples of other active hydrogen-containing compounds which can be used for ring-opening of the aforementioned epoxy rings include monophenols such as phenol, cresol, nonylphenol, and nitrophenol; monoalcohols such as monobutyl or monohexyl ethers of propylene glycol or ethylene glycol, stearyl alcohol, 2-ethylhexanol, or hexyl alcohol; aliphatic monocarboxylic acids such as stearic acid and octylic acid; aliphatic hydroxycarboxylic acids such as glycolic acid, dimethylolpropionic acid, hydroxypivalic acid, lactic acid, and citric acid; and mercapto alkanols such as mercaptoethanol.

Epoxy resins containing oxazolidone rings in the resin skeleton, such as those disclosed in Japanese Unexamined Patent Applications (Kokai) Nos. H5-306327, H6-329755, and H7-33848, are preferred as the aforementioned amine-modified epoxy resins. Amine-modified epoxy resins containing such oxazolidone rings are described in further detail.

It is well known that epoxy resins with extended chains containing oxazolidone rings can be obtained when bifunctional epoxy resins are allowed to react with monoalcohol-blocked diisocyanate compounds, that is, bisurethane. Amine-modified epoxy resins obtained by ring-opening the epoxy rings of epoxy resins with amines are an example of amine-modified epoxy resins containing such oxazolidone rings. Modified epoxy resins containing oxazolidone rings can be obtained when a bifunctional epoxy resin is allowed to react with an asymmetrical bisurethane compound that is obtained when one of the isocyanate groups of a diisocyanate compound has been reversibly blocked with a monoalcohol, and the other isocyanate group has been irreversibly blocked with a hydroxyl group-containing compound, in accordance with the method disclosed in Japanese Unexamined Patent Application (Kokai) No. H7-33848. A cationic modified epoxy resin is obtained when the epoxy rings of the resulting modified epoxy resin are opened with an active hydrogen compound permitting the introduction of cationic groups, such as an amine.

Hydroxyl compounds to be employed when the other isocyanate group of a diisocyanate compound is irreversibly blocked in this method are $C_4$ or higher aliphatic monoalcohols such as butanol and 2-ethylhexanol, long-chain alkyl phenols such as nonylphenol, and glycol monoethers such as mono-2-ethylhexyl ether of ethylene glycol or propylene glycol.

Examples of blocked polyisocyanate curing agents include those commonly used in the field, for example, aromatic diisocyanate compounds such as tolylene diisocyanate (TDI), 4,4'-diphenylmethane diisocyanate (MDI), and xylylene diisocyanate (XDI); aliphatic or alicyclic diisocyanate compounds such as hexamethylene diisocyanate (HMDI), isophorone diisocyanate (IPDI), 2,5- or 2,6-bis(isocyanatemethyl)bicyclo[2,2,1]heptane (norbornane diisocyanate NBDI); and blocked polyisocyanate compounds such as trimethylolpropane adducts and dimers or trimers of such diisocyanates.

The blocking agents used for the blocked polyisocyanate curing agent include those which undergo addition to isocyanate groups and are capable of reproducing isocyanate groups that are stable at ordinary temperature but are free when heated to or beyond the dissociation temperature.

Specific examples include phenol blocking agents such as phenol, cresol, xylenol, chlorophenol, and ethylphenol; lactam blocking agents such as ε-caprolactam, δ-valerolactam, γ-butyrolactam, and β-propiolactam; active methylene blocking agents such as ethyl acetoacetate and acetylacetone; alcohol blocking agents such as methanol, ethanol, propanol, butanol, amyl alcohol, ethylene glycol monomethyl ether, ethylene glycol monoethyl ether, ethylene glycol monomethyl ether, propylene glycol monomethyl ether, benzyl alcohol, methyl glycolate, butyl glycolate, diacetone alcohol, methyl lactate, and ethyl lactate; oxime blocking agents such as formaldoxime, acetoaldoxime, acetoxime, methyl ethyl ketoxime, diacetyl monooxime, and cyclohexane oxime; mercaptan blocking agents such as butyl mercaptan, hexyl mercaptan, t-butyl mercaptan, thiophenol, methylthiophenol, and ethylthiophenol; acid amide blocking agents such as succinic acid imide and benzamide; imide blocking agent such as imide succinate and maleic acid imide; and imidazole blocking agents such as imidazole and 2-ethyl imidazole. The use of lactam and oxime blocking agents is preferred when low temperature curing of 160° C. or lower is desired.

The aforementioned neutralizing agents are not particularly limited and are the same as those used to produce the aforementioned resin varnish for pigment dispersion. Specific examples include organic or inorganic acids such as hydrochloric acid, nitric acid, phosphoric acid, formic acid, acetic acid, and lactic acid.

The cationic electrodeposition coating composition of the present invention is produced in the following manner. That is, the aforementioned amine-modified epoxy resin and a blocked polyisocyanate curing agent are mixed to homogeneity in the prescribed amounts, and the resulting mixture is then dispersed in an aqueous medium containing a neutralizing agent, giving a mixture emulsion (hereinafter referred to as "main emulsion") of the amine-modified epoxy resin and the blocked isocyanate curing agent. The main emulsion, the aforementioned pigment dispersion paste, and deionized water are then mixed in the prescribed amounts, giving the cationic electrodeposition paint of the present invention.

The amount of the blocked polyisocyanate curing agent should be sufficient to react with the active hydrogen-containing functional groups such as amino groups or hydroxyl groups in the amine-modified epoxy resin when heated and cured, so as to provide a suitably cured film. The weight ratio of the amine-modified epoxy resin to the blocked polyisocyanate curing agent ranges from 90/10 to 50/50, and preferably from 80/20 to 65/35.

The aforementioned pigment dispersion paste is blended in such a way that the pigment is 1 to 35% relative to the total resin solids weight of the cationic electrodeposition paint. The cationic electrodeposition paint thus produced should contain 0.1 to 2 wt % polyalkylene oxide compound. Less than 0.1 wt % makes it difficult to reduce the VOCs, whereas more than 2 wt % runs the risk of lower corrosion resistance.

The cationic electrodeposition paint of the present invention can contain a tin compound such as dibutyltin dilaurate or dibutyltin oxide, or a common urethane cleavage catalyst. The amount that is added should be 0.1 to 5.0 wt % of the blocked polyisocyanate curing agent.

The cationic electrodeposition paint of the present invention can also include common paint additives, such as water-miscible organic solvents, surfactants, antioxidants, and UV absorbents.

EXAMPLES

The present invention is illustrated further below with reference to examples, but the present invention is not limited to these examples alone. Parts and percentages in the examples are based on weight, unless otherwise specified. Epoxy equivalents and amine equivalents indicate the numerical values per solids.

Manufacturing Example 1 (Production of Amine-Modified Epoxy Resin)

92 Parts of 2,4-/2,6-tolylene diisocyanate (weight ratio= 8/2), 95 parts methyl isobutyl ketone (MIBK), and 0.5 part dibutyltin dilaurate were introduced into a flask equipped with a stirrer, condenser tube, nitrogen feed tube, thermometer, and dropping funnel. 21 Parts methanol was added as the mixture was stirred. The reaction was begun at room temperature and heated to 60° C., the reaction was then continued for 30 minutes, and 57 parts ethylene glycol mono-2-ethylhexyl ether was added in the form of drops through the dropping funnel. To the content, 42 parts bisphenol-5 mol propylene oxide adduct A (PO 5) (BP-5P, by Sanyo Kasei) was added. The reaction was carried out primarily around 60 to 650° C., and was continued until IR spectroscopy revealed the disappearance of absorption based on isocyanate groups.

To the aforementioned mixture, 365 parts bisphenol A type epoxy resin with 188 epoxy equivalents (DER-331 J, by Dow Chemical) was added, and the mixture was heated to 125° C. Then, 1.0 part benzyl dimethylamine was added, and a reaction was brought about at 130° C. until 410 epoxy equivalents resulted.

87 parts bisphenol A was then added, and a reaction was brought about at 120° C., resulting in 1190 epoxy equivalents. The reaction mixture was then cooled, and 11 parts diethanolamine, 24 parts N-ethylethanolamine, and 25 parts of a 79% MIBK solution of a ketiminated product of aminoethylethanolamine were added, and a reaction was brought about for 2 hours at 110° C. The product was then diluted with MIBK, resulting in 80% nonvolatile components to give an amine-modified epoxy resin (80% resin solids).

Manufacturing Example 2 (Synthesis of Blocked Polyisocyanate Curing Agent)

Into the same flask as in Manufacturing Example 1, 723 parts 2,5- and 2,6-bis(isocyanate methyl)-bicyclo[2.2.1] heptane (103 isocyanate equivalents, by Mitsui Toatsu), 333 parts MIBK, and 0.01 part dibutyltin dilaurate were introduced. The resulting mixture was heated to 70° C. and dissolved to homogeneity, and 610 parts methyl ethyl ketoxime was then added in the form of drops over two hours. After all the drops of ketoxime had been added, the reaction was continued as the reaction temperature was kept at 70° C. until IR spectroscopy revealed the disappearance of absorption based on isocyanate groups, giving a methyl ethyl ketoxime blocked polyisocyanate curing agent (80% resin solids).

Manufacturing Example 3 (Production of Pigment dispersing resin Varnish Containing Quaternary Ammonium Groups)

To a suitable reaction vessel, 87.2 parts dimethylethanolamine, 117.6 parts 75% lactic acid aqueous solution, and 39.2 parts ethylene glycol monobutyl ether were added, in that sequence, and the ingredients were stirred for about a half hour at 65° C., giving a quaternization agent.

Into a suitable reaction vessel, 710.0 parts Epon 829 (bisphenol A epoxy resin by Shell Chemical Co.; 193 to 203 epoxy equivalents) and 289.6 parts bisphenol A were meanwhile introduced and heated to between 150 and 160° C. in a nitrogen atmosphere. The reaction mixture was reacted for about 1 hour at 150 to 160° C. and then cooled to 120° C., and 498.8 parts of the 2-ethylhexanol half-blocked IPDI (MIBK solution) prepared in Manufacturing Example 3 was added.

The reaction mixture was held for about 1 hour at 110 to 120° C., 1390.2 parts solvent comprising 695.1 parts ethylene glycol monobutyl ether and 695.1 parts polyalkylene oxide compound (BEP-60, by Sanyo Kasei, where R was an ethylene group, and m+n was about 6) was then added, the mixture was cooled to between 85 and 95° C. to homogeneity, and 196.7 parts of the quaternization agent prepared above was then added. The reaction mixture was held at 85 to 95° C. until the acid value was 1, and 37.0 parts deionized water was then added, giving a pigment dispersing resin varnish having quaternary ammonium groups (50% resin solids). The polyalkylene oxide compound accounted for 46 wt % of the total amount of solvent used to obtain the aforementioned pigment dispersing resin varnish. This means that the resin varnish contained 22 wt % polyalkylene oxide compound.

Manufacturing Example 4 (Production of Resin Varnish for Pigment Dispersion Having Primary Amino Groups)

Into a reaction container equipped with a stirrer, cooling tube, nitrogen feed tube, and thermometer, 222.0 parts isophorone diisocyanate (IPDI) was introduced, and diluted with 39.1 parts MIBK, and 0.2 part dibutyltin laurate was then added. The contents were then heated to 50° C., and 131.5 parts 2-ethylhexanol was added in the form of drops over 2 hours while stirred in a dry nitrogen atmosphere. The reaction temperature was then lowered to, and kept at, 50° C., giving 2-ethylhexanol half-blocked IPDI.

Into a reaction container equipped with a stirrer, cooling tube, nitrogen feed tube, and thermometer, 376.0 parts Epikote 828 (bisphenol A type epoxy resin by Petrochemical Shell Epoxy; 182 to 194 epoxy equivalents), 114.0 parts bisphenol A, and 28.8 parts octylic acid were then introduced. The reaction mixture was heated to 130° C. in a nitrogen atmosphere, 0.15 part dimethylbenzylamine was added, and a reaction was brought about for 1 hour at 170° C. (exothermic reaction), giving a bisphenol A type of epoxy resin with 649 epoxy equivalents. The resin was then cooled to 140° C., 396.8 parts of the 2-ethylhexanol half-blocked IPDI prepared above was then added, and a reaction was brought about for 1 hour at 140° C. 323.2 parts ethylene glycol monobutyl ether was then added to dilute the product, and the reaction mixture was then cooled to 100° C. 188.8 parts of a 78.8% MIBK solution of a methyl isobutyl monoketiminated product of aminoethylethanolamine was then added. The mixture was held for 1 hour at 110° C. and then cooled to 90° C., 360.0 parts deionized water was added, and the contents were then stirred for another 30 minutes, resulting in the conversion of the ketimine moities in the epoxy resin to primary amino groups. The excess water and MIBK were distilled off at reduced pressure from the mixture, and the mixture was then diluted with 252.3 parts butyl cellosolve and 323.5 parts polyalkylene oxide compound (BPE-60 by Sanyo Kasei, where R was an ethylene group, and m+n was about 6), giving a resin varnish for a pigment dispersion having primary amino groups (50% resin solids). The polyalkylene oxide compound accounted for 36 wt % of the total amount of solvent used to obtain the aforementioned pigment dispersing resin varnish. This means that the resin varnish contained 17 wt % polyalkylene oxide compound.

Manufacturing Example 5 (Production of Pigment dispersing resin Varnish Having Sulfonium Groups)

Into a suitable reaction container, 382.2 parts bisphenol with 188 epoxy equivalents (by Dow Chemical Co.) and 117.8 parts bisphenol A were introduced and heated to between 150 and 160° C. in a nitrogen atmosphere. The reaction mixture was allowed to react for about 1 hour at 150 to 160° C. and was then cooled to 120° C., and 209.8 parts of the 2-ethylhexanol half-blocked IPDI (MIBK solution) obtained in Manufacturing Example 3 was then added. A reaction was brought about for 1 hour at 140 to 150° C., 205 parts of the same polyalkylene oxide compound as that used in Manufacturing Example 3 was then added, and the temperature was cooled to between 60 and 65° C. Then, 408.0 parts 1-(2-hydroxyethylthio)-2-propanol, 144.0 parts deionized water, and 134 parts dimethylolpropionic acid were added, a reaction was brought about at 65 to 75° C. until the acid value was 1, tertiary sulfonium groups were introduced to the epoxy resin, and 1595.2 parts deionized water was added to conclude the tertiary conversion, giving a pigment dispersing resin varnish containing tertiary sulfonium groups (30% solids). The polyalkylene oxide compound served as the solvent used to obtain the aforementioned pigment dispersing resin varnish. The resin varnish contained 6.4 wt % polyalkylene oxide.

Manufacturing Example 6 (Preparation of Pigment dispersing resin)

A pigment dispersing resin varnish was prepared in the same manner as in Manufacturing Example 3 except that the polyalkylene oxide compound in Manufacturing 3 was changed to ethylene glycol monobutyl ether.

Manufacturing Example 7 (Preparation of Pigment Dispersion Paste)

Into a sand grind mill, 60 parts, in terms of solids, of the pigment dispersing resin varnishes obtained in Manufacturing Example 3 through 6, 2.0 parts carbon black, 100.0 parts kaolin, 80.0 parts titanium dioxide, 18.0 parts aluminum phosphomolybdate, and 221.7 parts deionized water were introduced and were dispersed to a particle size of no more than 10 μm, and pigment dispersion pastes were obtained using any of Manufacturing Examples 3.

Manufacturing Examples 8 to 10 (Preparation of Pigment dispersion paste)

A pigment dispersion paste was prepared in the same manner as in Manufacturing Example 7, except that the pigment dispersing resin varnish obtained in Manufacturing Examples 4 to 6 was employed and an amount of ion exchanged water was changed to 152.7 parts for Manufacturing Example 8, 33.3 parts for Manufacturing Example 9 and 221.7 parts for Manufacturing Example 10.

Example 1

The amine-modified epoxy resin of Manufacturing Example 1 and the blocked polyisocyanate curing agent of Manufacturing Example 2 were mixed to homogeneity in a solids blending ratio of 75:25, and ethylene glycol mono-2-ethylhexyl ether was then added to a solids concentration of 3%. Glacial acetic acid was added for neutralization to 43.0% neutralization, and deionized water was further added carefully for dilution. The MIBK was distilled off at reduced pressure to a solids concentration of 36.0%, giving the main emulsion. 1500.0 parts of the main emulsion and 541.7 parts of the pigment dispersion paste obtained in Manufacturing Example 7 using the pigment dispersing resin varnish obtained in Manufacturing Example 3 were mixed with 1949.3 parts deionized water and 9.0 parts dibutyltin oxide to prepare a cationic electrodeposition paint with 20.0% solids. The content of the polyalkylene oxide compound was 3.3%.

Examples 2 and 3, and Comparative Example

Cationic electrodeposition paint were prepared with the blends in Table 1 in the same manner as Example 1 except that the pigment dispersing resin varnishes that were used were those given in Table 1.

TABLE 1

|  | Example 1 | Example 2 | Example 3 | Comparative Example |
|---|---|---|---|---|
| Type of pigment dispersing resin varnish | Mfg. Ex. 3 | Mfg. Ex. 4 | Mfg. Ex. 5 | Mfg. Ex. 6 |
| Blended amount (parts) |  |  |  |  |
| Main emulsion | 1,500 | 1,500 | 1,500 | 1,500 |
| Pigment dispersion paste | 541.7 | 472.7 | 433.3 | 541.7 |
| Deionized water | 1,949.3 | 2,018.3 | 2,057.7 | 1,949.3 |
| Dibutyl tin oxide | 9 | 9 | 9 | 9 |
| Content of polyalkylene oxide compound in paint | 0.67% | 0.51% | 0.32% | 0 |

Evaluation of Electrodeposition Coating Film

The cationic electrodeposition paint obtained in the above examples and comparative example were applied by electrodeposition at a voltage resulting in a baked film thickness of 20 μm on zinc phosphate-treated steel sheets, and were baked for 15 minutes at 160° C. Examination of the appearance of the resulting coated films revealed that all of the cationic electrodeposition paint in Examples 1 through 3 and the comparative example had an attractive appearance and good flow properties.

As indicated by the test results, the appearance of the electrodeposition coating films did not deteriorate even when part or all of the ethylene glycol monobutyl ether conventionally used as a solvent was replaced with the aforementioned polyalkylene oxide compounds during the onium conversion of the epoxy resin or after the conclusion of the onium conversion reaction in accordance with the method for producing a pigment dispersing resin varnish in the present invention. That is, the amount of the ethylene glycol monobutyl ether serving as the volatile solvent component in the cationic electrodeposition paint could be reduced without affecting the appearance of the electrodeposition coating film.

It is thus possible to reduce the content of volatile components in paint, without affecting the appearance of electrodeposition coating films, when using a solvent that contains the aforementioned polyalkylene oxide compounds in methods for producing pigment dispersing resin varnishes. That is, the amount of harmful air pollutants contained in cationic electrodeposition coating compositions can be drastically reduced because conventionally used volatile cellosolve solvents such as butyl cellosolve and ethyl cellosolve can be replaced with the aforementioned polyalkylene oxide compounds as such solvents.

What is claimed is:

1. A method for producing a pigment dispersing resin varnish for cationic electrodeposition paint, comprising the step of using a solvent comprising a polyalkylene oxide compound represented by the following formula for producing a resin varnish which is obtained from a cationic epoxy resin composition having amino groups, phosphonium groups, or sulfonium groups

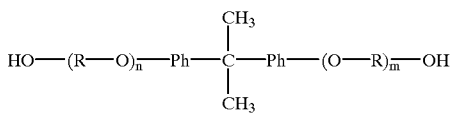

(where R is an ethylene group or propylene group; Ph is a phenylene group; and both n and m are a number of 1 or more).

2. A method for producing a pigment dispersing resin varnish according to claim 1, wherein the solvent is added to the cationic epoxy resin composition, which has been obtained upon the reaction of an amine, phosphine, or sulfide with an epoxy resin.

3. A method for producing a pigment dispersing resin varnish according to claim 1, wherein the solvent is used as a reaction solvent when producing the cationic epoxy resin composition which is obtained upon the reaction of an amine, phosphine, or sulfide with an epoxy resin.

4. A method for producing a pigment dispersing resin varnish according to any of claims 1 through 3, wherein the epoxy resin comprises a urethane-modified epoxy resin.

5. A method for producing a pigment dispersing resin varnish according to any of claims 1 through 3, wherein R in the formula for the polyalkylene oxide compound is an ethylene group, and the total of n and m is 2 or more but less than 20.

6. A method for producing a pigment dispersing resin varnish according to any of claims 1 through 3, wherein the content of the polyalkylene oxide compound in the solvent is 5 to 100 wt %.

7. A pigment dispersing resin varnish for cationic electrodeposition paint, which is obtained by a method according to any of claims 1 through 3.

8. A pigment dispersing resin varnish for cationic electrodeposition paint, wherein the content of the polyalkylene oxide compound in the pigment dispersing resin varnish according to claim 7 is 1 to 50 wt %.

9. A cationic electrodeposition coating composition comprising a pigment dispersing resin varnish according to claim 7, wherein the content of the polyalkylene oxide compound is 0.1 to 2.0 wt %.

10. A method for producing a pigment dispersing resin varnish according to claim 4, wherein R in the formula for the polyalkylene oxide compound is an ethylene group, and the total of n and m is 2 or more but less than 20.

11. A method for producing a pigment dispersing resin varnish according to claim 4, wherein the content of the polyalkylene oxide compound in the solvent is 5 to 100 wt %.

12. A method for producing a pigment dispersing resin varnish according to claim 5, wherein the content of the polyalkylene oxide compound in the solvent is 5 to 100 wt %.

13. A pigment dispersing resin varnish for cationic electrodeposition paint, which is obtained by a method according to claim 4.

14. A pigment dispersing resin varnish for cationic electrodeposition paint, which is obtained by a method according to claim 5.

15. A pigment dispersing resin varnish for cationic electrodeposition paint, which is obtained by a method according to claim 6.

16. A cationic electrodeposition coating composition comprising a pigment dispersing resin varnish according to claim 8, wherein the content of the polyalkylene oxide compound is 0.1 to 2.0 wt %.

\* \* \* \* \*